United States Patent
Forster

(10) Patent No.: US 8,019,731 B2
(45) Date of Patent: Sep. 13, 2011

(54) METHOD AND SYSTEM FOR UPDATING AN ARCHIVE OF A COMPUTER FILE

(75) Inventor: Karl D. Forster, Paradise Valley, AZ (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 12/888,047

(22) Filed: Sep. 22, 2010
(Under 37 CFR 1.47)

(65) Prior Publication Data

US 2011/0010345 A1    Jan. 13, 2011

Related U.S. Application Data

(60) Division of application No. 12/725,205, filed on Mar. 16, 2010, which is a division of application No. 10/188,512, filed on Jul. 3, 2002, now Pat. No. 7,730,031, which is a continuation of application No. 09/991,613, filed on Nov. 5, 2001, now abandoned, which is a continuation of application No. 09/797,890, filed on Mar. 1, 2001, now abandoned.

(60) Provisional application No. 60/186,137, filed on Mar. 1, 2000.

(51) Int. Cl.
*G06F 7/00* (2006.01)
*G06F 17/00* (2006.01)
(52) U.S. Cl. .................................. 707/667; 707/673
(58) Field of Classification Search .................. None
See application file for complete search history.

(56) References Cited

U.S. PATENT DOCUMENTS

| | | | |
|---|---|---|---|
| 4,328,580 A | 5/1982 | Stockham, Jr. et al. | 371/8 |
| 4,677,558 A | 6/1987 | Bohmler et al. | 364/431.04 |
| 4,858,131 A | 8/1989 | Sugimura et al. | 364/424.1 |
| 5,133,065 A | 7/1992 | Cheffetz et al. | 714/2 |
| 5,163,148 A | 11/1992 | Walls | 711/162 |
| 5,247,444 A | 9/1993 | Arai et al. | 364/431.05 |
| 5,263,154 A | 11/1993 | Eastridge et al. | 714/6 |

(Continued)

FOREIGN PATENT DOCUMENTS

EP    0 268 139    5/1988

(Continued)

OTHER PUBLICATIONS

Notification of Transmittal of the International Search Report or the Declaration (PCT Rule 44.1) mailed Oct. 9, 2001 corresponding to International Application No. PCT/US01/06820 filed Mar. 1, 2001, 7 pages.

(Continued)

*Primary Examiner* — Cam Truong
(74) *Attorney, Agent, or Firm* — Pillsbury Winthrop Shaw Pittman LLP

(57) ABSTRACT

A method and system for updating an archive of a computer file to reflect changes made to the file includes selecting one of a plurality of comparison methods as a preferred comparison method. The comparison methods include a first comparison method wherein the file is compared to an archive of the file and a second comparison method wherein a first set of tokens statistically representative of the file is computed and compared to a second set of tokens statistically representative of the archive of the file. The method further includes carrying out the preferred comparison method to generate indicia of differences between the file and the archive of the file for updating the archive of the file.

6 Claims, 7 Drawing Sheets

U.S. PATENT DOCUMENTS

| | | | |
|---|---|---|---|
| 5,355,449 A | 10/1994 | Lung et al. | 395/150 |
| 5,384,912 A | 1/1995 | Ogrinc et al. | 395/164 |
| 5,426,774 A | 6/1995 | Banerjee et al. | 395/575 |
| 5,446,875 A | 8/1995 | Ogisu et al. | 395/575 |
| 5,479,654 A | 12/1995 | Squibb | 395/600 |
| 5,522,037 A | 5/1996 | Kitagawa et al. | 714/40 |
| 5,546,534 A | 8/1996 | Malcolm | 395/182.04 |
| 5,566,297 A | 10/1996 | Devarakonda et al. | 395/182.13 |
| 5,574,906 A * | 11/1996 | Morris | 707/640 |
| 5,590,040 A | 12/1996 | Abe et al. | 364/424.04 |
| 5,615,364 A | 3/1997 | Marks | 707/999.202 |
| 5,634,052 A | 5/1997 | Morris | 395/601 |
| 5,659,614 A | 8/1997 | Bailey, III | 380/4 |
| 5,664,186 A | 9/1997 | Bennett et al. | 1/1 |
| 5,664,231 A | 9/1997 | Postman et al. | 395/893 |
| 5,671,374 A | 9/1997 | Postman et al. | 395/309 |
| 5,675,725 A | 10/1997 | Malcolm | 395/182.04 |
| 5,689,513 A | 11/1997 | Okita et al. | 371/20.1 |
| 5,720,026 A | 2/1998 | Uemura et al. | 395/182.04 |
| 5,765,173 A | 6/1998 | Cane et al. | 1/1 |
| 5,799,147 A | 8/1998 | Shannon | 714/6 |
| 5,806,078 A | 9/1998 | Hug et al. | 707/511 |
| 5,812,840 A * | 9/1998 | Shwartz | 1/1 |
| 5,813,017 A | 9/1998 | Morris | 707/204 |
| 5,832,520 A * | 11/1998 | Miller | 1/1 |
| 5,852,713 A | 12/1998 | Shannon | 714/6 |
| 5,859,971 A | 1/1999 | Bittinger et al. | 395/200.33 |
| 5,860,071 A | 1/1999 | Ball et al. | 707/100 |
| 5,875,290 A | 2/1999 | Bartfai et al. | 395/182.1 |
| 5,905,866 A | 5/1999 | Nakabayashi et al. | 395/200.53 |
| 5,931,904 A | 8/1999 | Banga et al. | 709/217 |
| 5,974,563 A | 10/1999 | Beeler, Jr. | 714/5.11 |
| 5,987,575 A | 11/1999 | Yamaguchi | 711/162 |
| 6,014,669 A | 1/2000 | Slaughter et al. | 707/10 |
| 6,044,444 A | 3/2000 | Ofek | 711/162 |
| 6,088,694 A | 7/2000 | Burns et al. | 1/1 |
| 6,092,066 A | 7/2000 | Ofek | 1/1 |
| 6,101,497 A | 8/2000 | Ofek | 707/657 |
| 6,233,589 B1 * | 5/2001 | Balcha et al. | 707/625 |
| 6,260,124 B1 | 7/2001 | Crockett et al. | 711/162 |
| 6,282,610 B1 | 8/2001 | Bergsten | 711/114 |
| 6,513,052 B1 | 1/2003 | Binder | 707/204 |
| 6,526,419 B1 | 2/2003 | Burton et al. | 707/204 |
| 6,622,259 B1 | 9/2003 | Schmuck | 714/4 |
| 6,711,572 B2 | 3/2004 | Zakharov et al. | 707/655 |
| 6,950,871 B1 | 9/2005 | Honma et al. | 709/226 |
| 6,959,369 B1 | 10/2005 | Ashton et al. | 711/162 |
| 7,043,485 B2 | 5/2006 | Manley et al. | 707/100 |
| 7,055,059 B2 | 5/2006 | Yanai et al. | 714/6.32 |
| 7,085,860 B2 | 8/2006 | Dugan et al. | 710/36 |
| 7,139,782 B2 | 11/2006 | Osaki | 1/1 |
| 7,152,183 B2 | 12/2006 | Fujibayashi | 714/6.31 |
| 7,570,586 B1 | 8/2009 | Albert et al. | 370/229 |
| 7,620,040 B2 | 11/2009 | Bhaskaran | 370/389 |
| 7,730,031 B2 | 6/2010 | Forster | 707/625 |
| 7,761,616 B2 | 7/2010 | Vageline | 710/14 |
| 7,840,535 B2 | 11/2010 | Barboi et al. | 707/634 |
| 2002/0010702 A1 | 1/2002 | Ajtai et al. | 707/101 |
| 2002/0178360 A1 | 11/2002 | Wenocur et al. | 713/170 |
| 2003/0212920 A1 | 11/2003 | Fujibayashi | 714/7 |
| 2004/0083245 A1 | 4/2004 | Beeler, Jr. | 1/1 |
| 2004/0220980 A1 | 11/2004 | Forster | 1/1 |
| 2005/0021869 A1 | 1/2005 | Aultman et al. | 709/249 |
| 2005/0065986 A1 | 3/2005 | Bixby et al. | 707/204 |
| 2006/0031594 A1 | 2/2006 | Kodama | 710/5 |
| 2006/0101097 A1 | 5/2006 | Barboi et al. | 1/1 |
| 2007/0112892 A1 | 5/2007 | Langley et al. | 707/204 |
| 2010/0174685 A1 | 7/2010 | Forster | 707/667 |

FOREIGN PATENT DOCUMENTS

| | | |
|---|---|---|
| EP | 0 314 250 | 5/1989 |
| EP | 0 410 630 | 1/1991 |
| EP | 0 692 121 | 1/1996 |
| EP | 0 769 741 | 4/1997 |
| EP | 0 774 715 | 5/1997 |
| EP | 0 836 145 | 4/1998 |
| EP | 0 880 096 | 11/1998 |
| EP | 0 899 662 | 3/1999 |
| EP | 0 921 466 | 6/1999 |
| EP | 0 921 467 | 6/1999 |
| EP | 0 965 908 | 12/1999 |
| EP | 0 981 090 | 2/2000 |
| JP | 7-084728 | 3/1995 |
| JP | 7-110783 | 4/1995 |
| JP | 9-323805 | 12/1997 |
| JP | 10-021250 | 1/1998 |
| JP | 10-171694 | 6/1998 |
| JP | 11-212875 | 8/1999 |
| JP | 11-168555 | 1/2001 |
| WO | WO 94/10630 | 5/1994 |
| WO | WO 94/23377 | 10/1994 |
| WO | WO 95/01599 | 1/1995 |
| WO | WO 95/19599 | 7/1995 |
| WO | WO 95/30184 | 11/1995 |
| WO | WO 96/29650 | 9/1996 |
| WO | WO 97/15890 | 5/1997 |
| WO | WO 97/31319 | 8/1997 |
| WO | WO 99/09480 | 2/1999 |
| WO | WO 99/12098 | 3/1999 |
| WO | WO 99/12101 | 3/1999 |
| WO | WO 99/57658 | 11/1999 |

OTHER PUBLICATIONS

Oracle® Database Advanced Replication Management APR Reference, 10g Release 1, Part No. B10733-01, Dec. 2003, Oracle®, 702 pages.

Page, Jr., Thomas W., et al., "Management of Replicated Volume Location Data in the Ficus Replicated File System", *Proceedings of the Summer USENIX Conference*, Jun. 1991, pp. 17-29 (13 pages).

Popek, Gerald J., et al., "Replication in Ficus Distributed Systems", *Proceedings of the Workshop on Management of Replicated Data*, Nov. 1990, pp. 20-25 (6 pages).

Guy, Richard G., et al., "Implementation of the Ficus Replicated File System", *Proceedings of the Summer USENIX Conference*, Anaheim, California, Jun. 1990, pp. 63-71 (10 pages).

Lo, Sai-Lai, "*Ivy*: A Study of Replicating Data for Performance Improvement", Hewlett-Packard Laboratories Concurrent Computing Department, Dec. 14, 1990, HPL-CSP-90-48, pp. 1-39 (40 pages).

Bhide, Anupam, et al., "A Comparison of Two Approaches to Build Reliable Distributed File Servers", *Proceedings of the 11th International Conference on Distributed Computing Systems*, May 1991, pp. 616-623 (8 pages).

Bhide, Anupam, et al., "A Highly Available Network File Server", *Proceedings of the USENIX Winter Conference 1991*, Jan. 1991, pp. 199-205 (10 pages).

Bhide, Anupam, et al., "Implicit Replication in a Network File Server", *Proceedings of the Workshop on Management of Replicated Data*, Nov. 1990, 6 pages.

"CA XOsoft™ Replication and CA XOsoft™ High Availability to Support Flexible Business Continuity Over Any Distance", Product Family Brief: CA XOSOFT, MP324990108, Copyright 2008 CA, 12 pages.

White Paper: "Improving Microsoft Exchange Server Recovery with EMC RecoverPoint: Applied Technology", Dec. 2008, 13 pages.

* cited by examiner

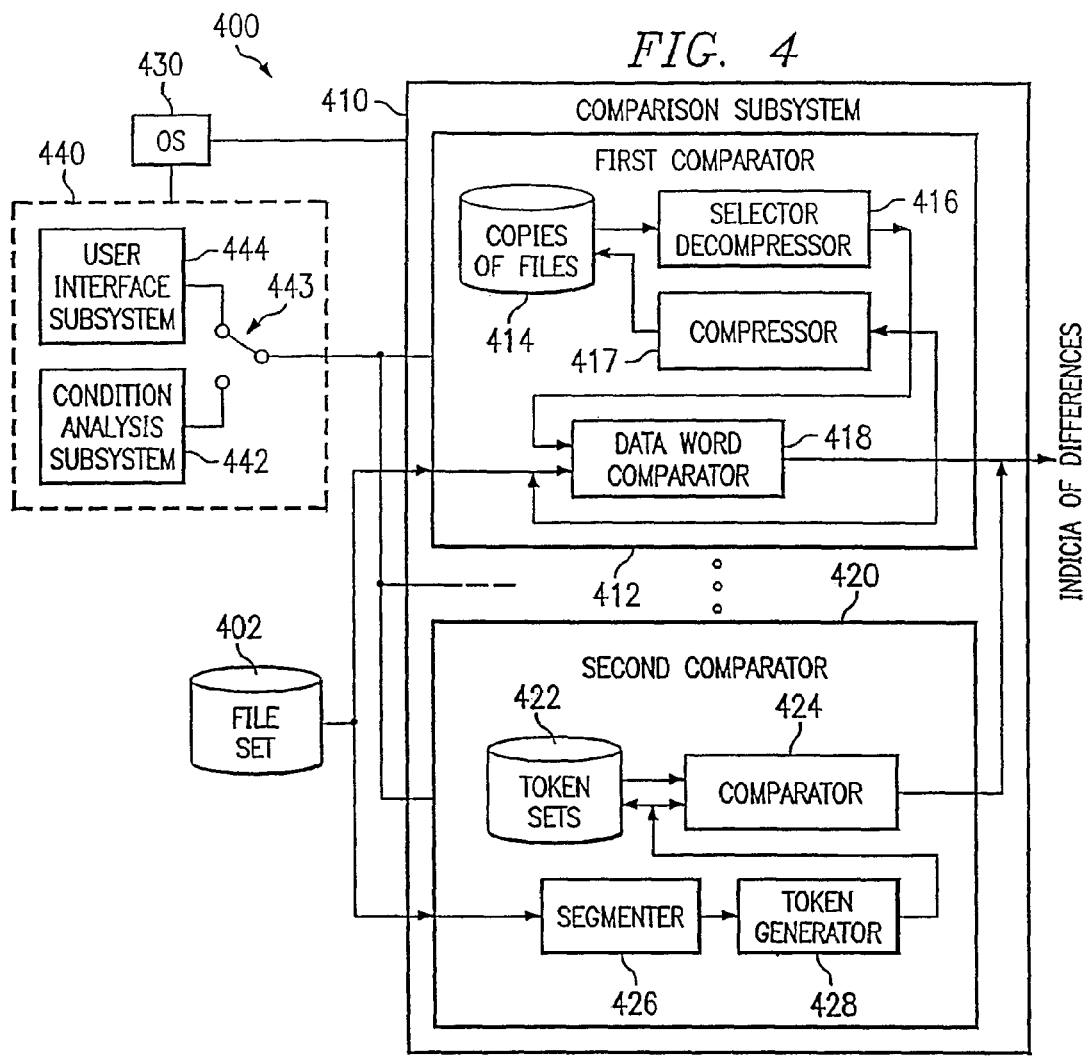

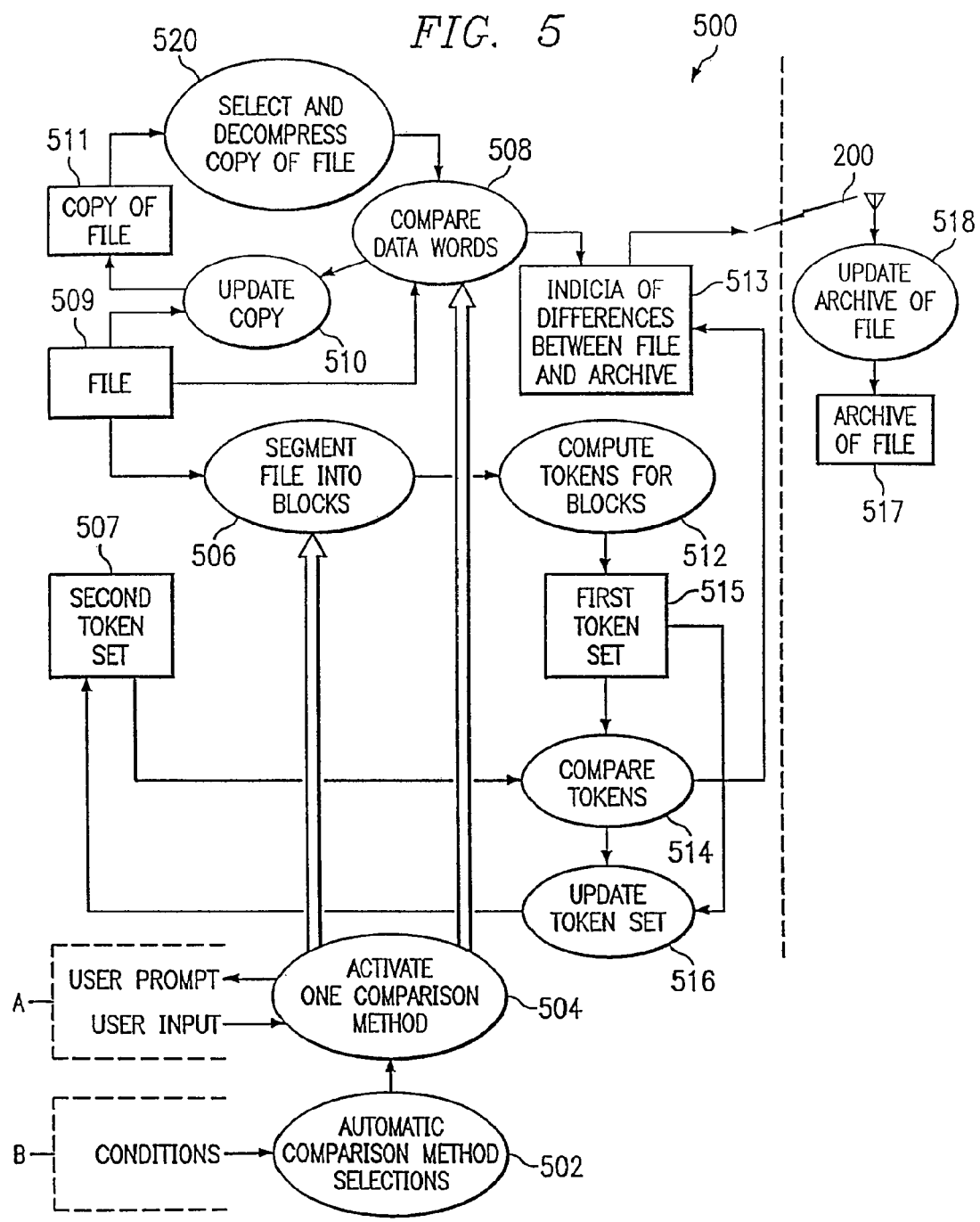

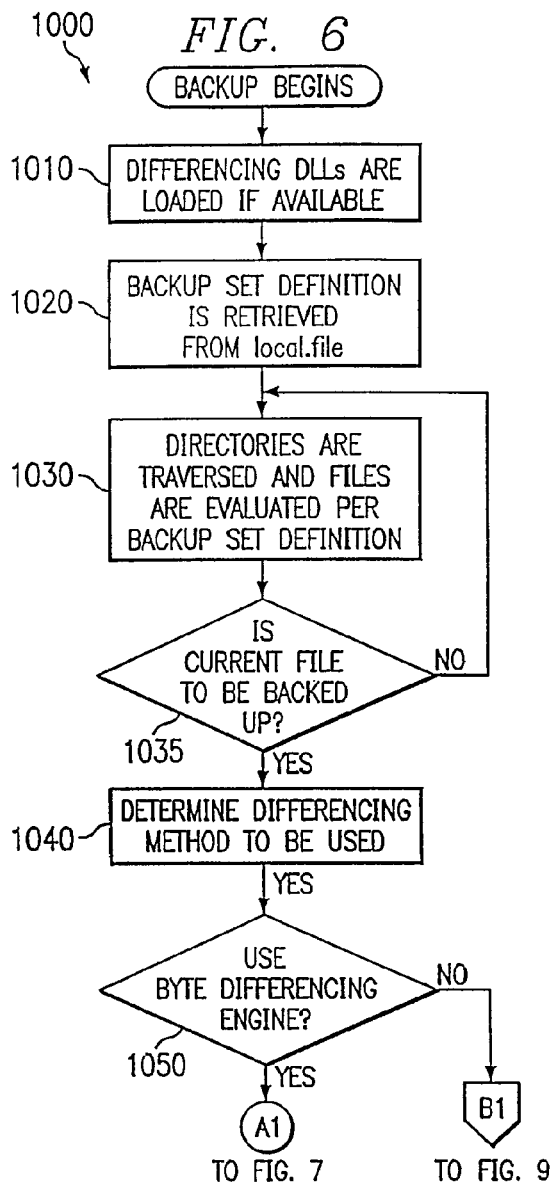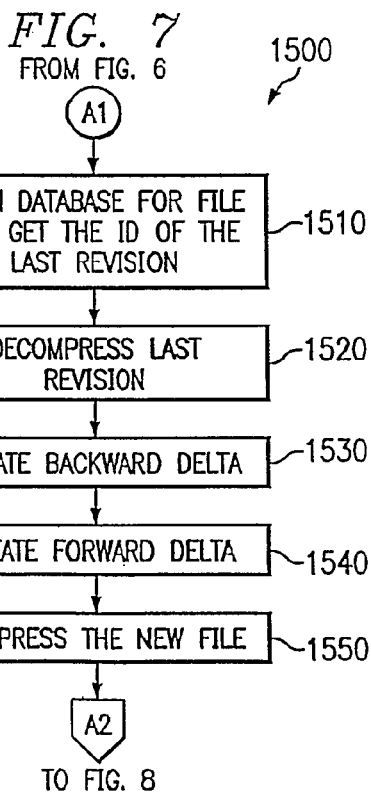

METHOD AND SYSTEM FOR UPDATING AN ARCHIVE OF A COMPUTER FILE

RELATED APPLICATIONS

This application is a divisional of U.S. patent application Ser. No. 12/725,205, entitled "Method and System for Updating an Archive of a Computer File," filed Mar. 16, 2010, which is a divisional of U.S. patent application Ser. No. 10/188,512, filed Jul. 3, 2002 entitled "Method and System for Updating an Archive of a Computer File," which issued as U.S. Pat. No. 7,730,031 on Jun. 1, 2010, and which is a continuation of abandoned U.S. patent application Ser. No. 09/991,613, filed Nov. 5, 2001, entitled "Method And System For Updating An Archive Of A Computer File," which is a continuation of abandoned U.S. patent application Ser. No. 09/797,890, filed Mar. 1, 2001, entitled "Method And System For Updating An Archive Of A Computer File," which claims priority to the benefit of U.S. Provisional Patent Application Ser. No. 60/186,137, filed Mar. 1, 2000, entitled "File Archiving System," each of which are hereby incorporated by reference in their entirety.

TECHNICAL FIELD OF THE INVENTION

This invention relates generally to the field of file archiving, and more particularly to a method and system for updating an archive of a computer file.

BACKGROUND OF THE INVENTION

File archiving systems backup computer files to protect against data loss. As files are modified over time, a comparator differentiates between new and archived file versions for the purpose of updating the archived versions. Known comparators include revision control engines and exclusive-or (XOR) processes.

Conventional comparators and differentiating systems used in file archiving systems suffer disadvantages in that they are process or memory intensive and inflexible. As a result, they are unsuitable for some systems, applications and/or conditions.

SUMMARY OF THE INVENTION

The present invention provides an improved method and system for updating an archive of a computer file to substantially reduce or eliminate problems and disadvantages associated with previous systems and methods. In particular, one of a plurality of comparators is selected based on user and/or system input, conditions or criteria to optimize data store, data transfer or other archive resources.

A method and system for updating an archive of a computer file to reflect changes made to the file includes selecting one of a plurality of comparison methods as a preferred comparison method. The comparison methods include a first comparison method wherein the file is compared to an archive of the file and a second comparison method wherein a first set of tokens statistically representative of the file is computed and compared to a second set of tokens statistically representative of the archive of the file. The method further includes carrying out the preferred comparison method to generate indicia of differences between the file and the archive of the file for updating the archive of the file.

A further aspect of the present invention involves a method and system for file archiving including selecting a selected comparison method for comparison between a first file and an associated second file based on at least one condition. The selected comparison is selected from a first comparison method and a second comparison method. The first comparison method comprises comparing at least one respective byte associated with the first file to at least one byte associated with the second file. The second comparison method comprises comparing a first set of statistics associated with the first file to a second set of statistics associated with the second file. The method also includes generating at least one indicia of difference based on the first file, the second file and the selected comparison method and updating the first file based on the indicia. The method also includes providing the indicia for updating the first file based on the indicia of difference.

Technical advantages of the present invention will be readily apparent to one skilled in the art from the following figures, description and claims.

BRIEF DESCRIPTION OF THE DRAWINGS

The present invention is best understood from the detailed description which follows, taken in conjunction with the accompanying drawings, in which:

FIG. 4 is a block diagram illustrating an archiving system for the client computer of FIG. 3 according to one embodiment of the present invention;

FIG. 5 is a flow diagram illustrating an exemplary method for updating an archive of a file according to one embodiment of the present invention;

FIGS. 6-9 are a flowchart illustrating a method for updating an archive of a computer file according to one embodiment of the present invention.

DESCRIPTION OF PREFERRED EXEMPLARY EMBODIMENTS

Figure 1:
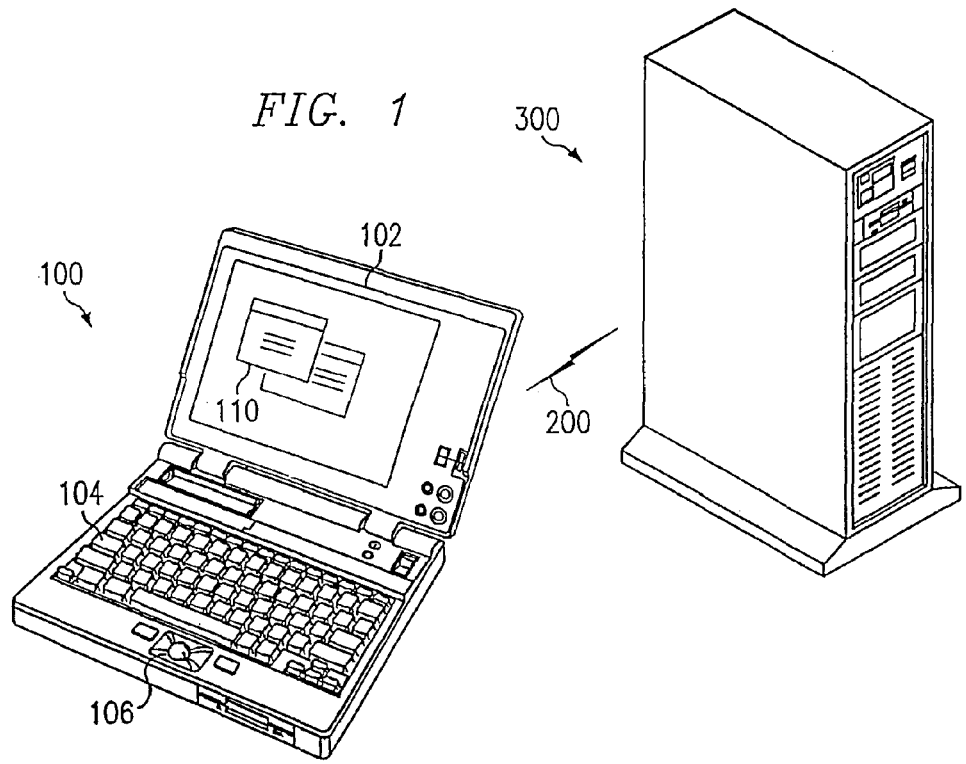
FIG. 1 is a diagram illustrating a distributed file archiving system according to one embodiment of the present invention.

FIG. 1 illustrates a client computer 100 connected to a server computer 300 via an Internet or other network connection 200 to update file archives on server computer 300. Client and server computers 100 and 300 can be any suitable types of conventional computers such as a laptop, a personal computer (PC), a desktop PC, a handheld PC, and the like, or computers specially configured for a specific purpose. In one embodiment for example, client computer 100 may be a laptop connected to a server computer 300 through phone lines from a hotel room. In another embodiment, client computer 100 may be specially configured, incorporated into medical diagnostic equipment, and connected to a central server computer 200 via the Internet for archiving valuable information. As records are updated on a particular client computer 100 throughout a diagnostic process or a series of processes, archives of the records can be updated on the central server computer using the present invention. It will be understood that the system and method for archiving files according to various aspects of the present invention can be implemented by any other suitable combinations of hardware and software.

As described in more detail below, the system and method for archiving files according to various aspects of the present invention includes updating of file archives on a server computer 300 to reflect changes to files made on a client computer 100. In such a system, one or more updated files are compared to archived versions of the files using a comparison method that is selected from two or more available comparison methods. A comparator using a first one of the methods compares an updated file to a copy of the file that is resident on the client computer 100, providing indicia of one or more data words, or bytes, that are different between the file and the file's archive. A comparator using a second one of the comparison methods partitions, or segments, the updated file into blocks, or segments, computes a token per block to generate a set of tokens that are statistically representative of the updated file and compares those tokens to another set of tokens which are statistically representative of the archive of the file. When using the second method, a comparator provides indicia of one or more blocks containing data words that are different between the file and its archive. Other suitable comparison methods may also be employed. By providing a plurality of available comparison methods, the system permits a suitable comparison method for a given set of conditions to be chosen.

Figure 2:
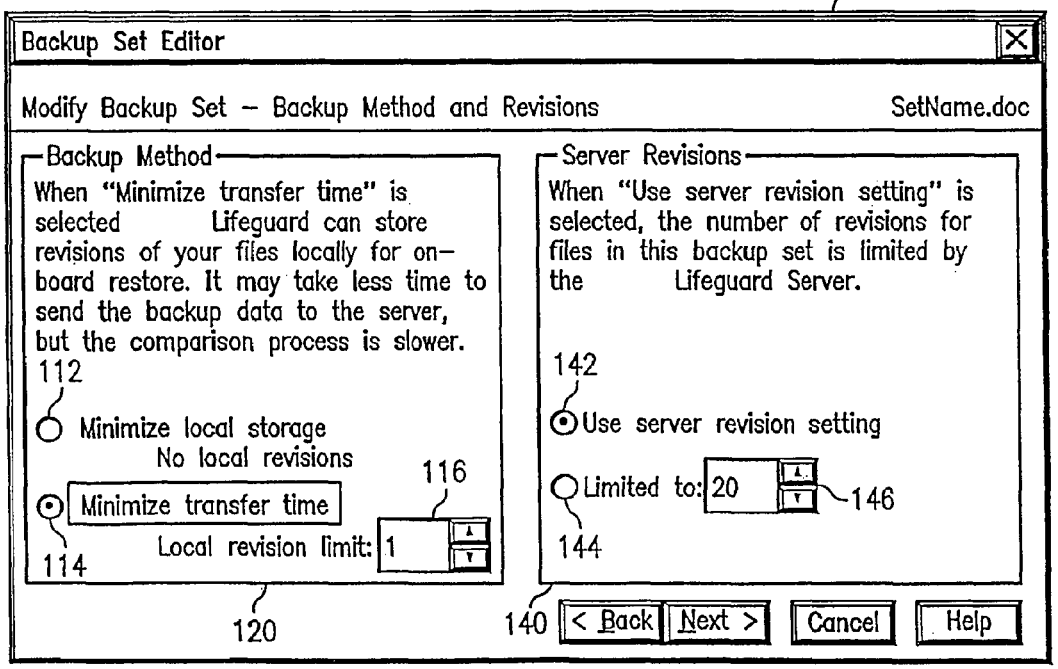
FIG. 2 is a screen diagram illustrating a user interface for controlling a backup process according to one embodiment of the present invention.

FIG. 2 illustrates a user interface on client computer 100 for prompting a user to specify one of the available comparison methods by selecting a condition for optimization in the archiving of one or more files. The comparison method can be selected by any suitable technique, either manually or automatically.

Referring to FIG. 2, for example, computer 100 displays a dialog box 110 entitled "Backup Set Editor" to prompt for user input. Dialog box 110 includes two main sections, a "Backup Method" section 120 and a "Server Revisions" section 140. "Backup Method" section 120 includes two item selectors, such as radio buttons. A first selector 112 is labeled "Minimize local storage" and a second selector 114 is labeled "Minimize transfer time." The first and second selectors 112 and 114 permits the user to select one of two conditions for optimization during archiving of one or more files whose active location is on client computer 100.

A first condition is efficient use of data storage on the client computer 100. A second condition is efficient conveying of indicia from the client computer 100 to the server computer 300. The user can select the first condition for optimization by clicking on selector 112 and the second condition by clicking on selector 114.

User selection requires the user to decide at a gross level what comparison type or which differencing engine, will be used for a particular archival operation. Automatic selection dynamically determines the best differencing engine for a file on a file-by-file basis. Such a system can, at the time of backup, determine the best differencing engine for the file based on a set of conditions or criteria to be optimized. Such optimization improves the overall performance of the product because each file being backed up is processed by the optimal differencing engine for that file.

Examples of criteria to be evaluated, either individually or in various combinations using any suitable mathematical model include: bandwidth of the network available to the client at the time of the backup, the reliability of the network connection, which may be measured by requests for repeated packet transmission, the size of the file being backed up, the type of file being backed up, the amount of available hard disk storage space on the client computer, the efficiency at which the client computer's hard disk is operating, such as how fragmented the disk is and/or how new and fast the CPU-disk interface is, and costs of network connection, such as if the user is connected via an expensive satellite network.

To obtain criteria, the operating system of the client computer 100 may, for example, be queried to determine the bandwidth of the available network 200. If a particular operating system does not support such queries, a layered device driver could be implemented to capture the information from the modem or network interface card. If the bandwidth is determined to be below a threshold, the automatic selection system can pick a differencing engine that minimized indicia to be sent over the network. If the size of the file to be backed up is large, relative to the available disk storage on the client machine 100, the automatic selection system can pick a differencing engine that requires the least amount of local disk storage on the client machine 100. The automatic selection system can pick an appropriate differencing engine based on file type. One such example would be .pst files generated by MICROSOFT OUTLOOK. These files are large and change often and therefore are not handled efficiently by byte or block differencing engines. In variations where a differencing engine is available that more efficiently handles this type of file, the system can assign said engine to handle the .pst file.

"Backup Method" section 120 also permits the user to specify the number of revisions of backed up files to be kept on the client computer 100 via control 116. There are advantages and disadvantages associated with increasing the number of revisions kept on the client computer 100. If more revisions are kept on the client computer 100, there is a greater likelihood that a client restore request can be satisfied from the client computer's archives, eliminating the need for communication with the server 300. More revisions also require more disk space and more processing time when backups are performed.

"Server Revisions" section 140 permits the user to specify the number of revisions of backed up files to be kept on the server computer 300. Section 140 includes two item selectors, such as radio buttons. A first selector 142 is labeled "Use server revision setting" and a second selector 144 is labeled "Limited to:". The first and second selectors 142 and 144 permits the user to select one of two methods for limiting the number of revisions of backed up files to be kept on the server computer 300.

A first method is to allow the number of revisions to be kept on the server computer 300 to be determined by the value configured on the server computer 300 by the server computer's administrator. A second method is to allow the user on the client computer 100 to specify the number of revisions to be kept. The user can select the first method for specifying server revisions by clicking on selector 142 and the second method by clicking on selector 144. If the user selects the second method, the user can specify the number of revisions by entering the desired number of revisions in control 146. There are advantages and disadvantages associated with increasing the number of revisions kept on the server computer 300. More revisions mean that more versions of the backed up file can be restored. More revisions also require more disk space and more processing time when backups are performed.

Figure 3:
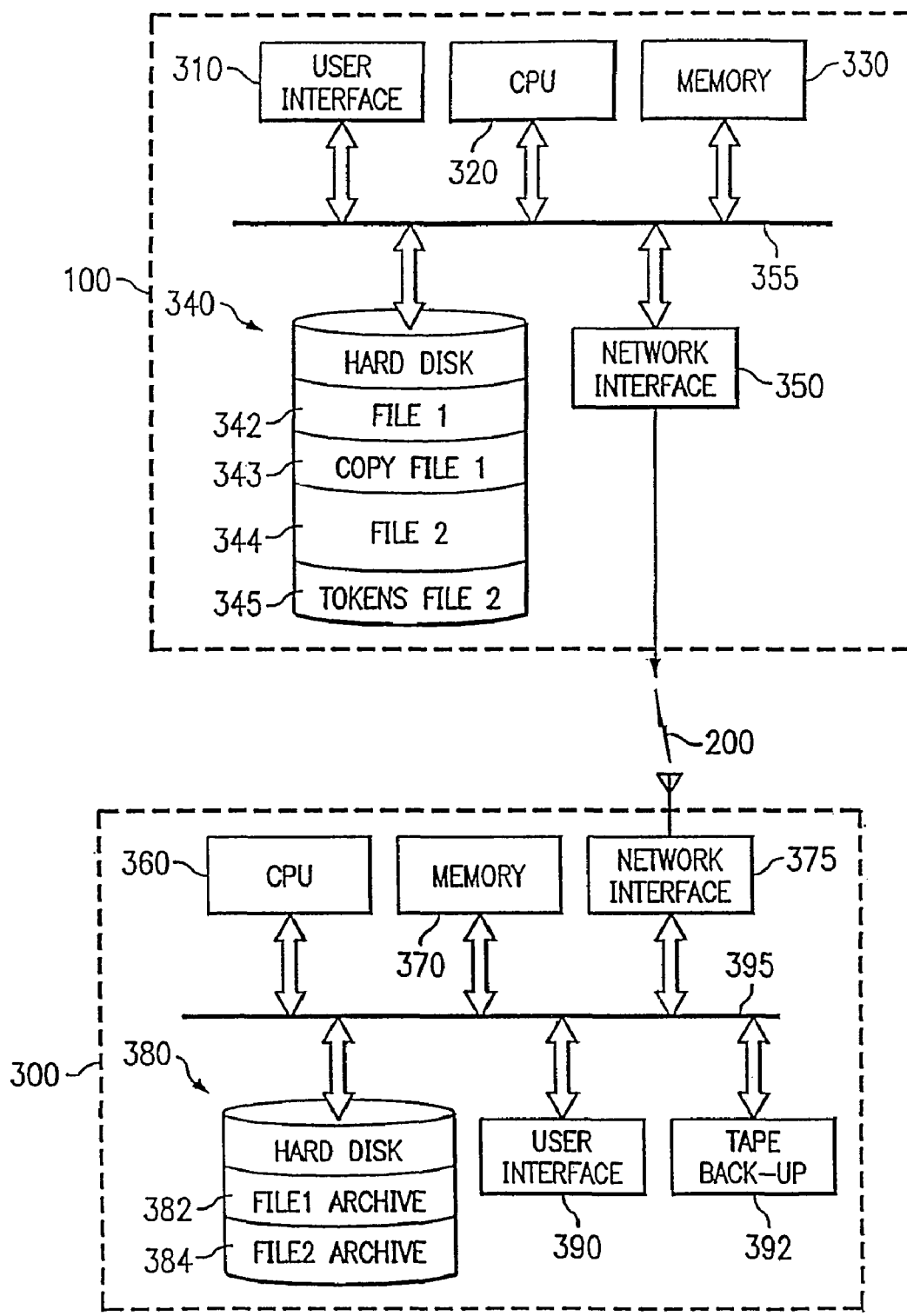
FIG. 3 is a block diagram illustrating details of the client computer and the server computer of FIG. 1 according to one embodiment of the present invention.

FIG. 3 is a block diagram illustrating details of the client computer 100 and the server computer 300. Referring to FIG. 3, laptop computer 100 includes conventional hardware, notably a user interface 310, a CPU 320, such as an Intel PENTIUM II or III, memory 330, such as RAM, 32-128 KB of RAM and BIOS ROM, a hard disk 340, such as a 2-10 GB capacity hard disk, and a network interface 350, all conventionally interconnected via a bus 355. Bus 355 can include a conventional high-speed bus, such as a 100 MHz, 32-bit bus coupling CPU 320 and memory 330 and one or more buses that may be of other speeds, such as UDMA-33, UDMA-66, PCI and AGP, coupling CPU to hard disk 340, network interface 350, and other hardware in client computer 100 as desired. User interface 310 includes any suitable hardware and/or software for prompting a user to provide input. For example, a flat-panel display 102 of any suitable type, such as an LCD and a TFT display user interface 310 may also include a conventional keyboard 104, and a conventional touch-sensitive pointing device 106.

Hard disk 340 includes magnetically recorded indicia of files, encoded and retrieved under control of CPU 320. Files on a hard disk, or other mass storage medium, of a client computer according to the invention include one or more files to be archived and one or more associated archive management files. For example, hard disk 340, includes indicia of a first file 342 to be archived named "file 1" and an archive management file 343 named "copy of file 1" for managing the archiving of file 342. In the example, file 342 is to be archived using the first comparison method in which file 343 is a copy of file 342 as it was last archived.

Hard disk 340 also includes indicia of a second file 344 to be archived named "file 2" and an archive management file 345 named "tokens file 2" for managing the archiving of file 344. In the example, file 344 is to be archived using the second comparison method in which file 345 includes a set of tokens that are statistically representative of the file as it was last archived. The second method is selected for archiving of 344 because file 344 occupies a more significant portion of the storage capacity of hard disk 340, and this method does not require that a copy of the file as last archived be kept on the client computer. Relative sizes of files on hard disk 340 are only illustrative and may not be indicative of storage capacity usage in an actual system.

To archive files 342 and 344, CPU 320 executes software from memory 330 that implements functions of exemplary system 400. CPU 320 conventionally loads the software from hard disk 340 into memory 330 by carrying out functions of a disk operating system such as WINDOWS 98. File 342 is part of a first backup set (not shown), the files of which are archived using settings that are selected by user input and/or automatically. The settings can include selection of one of the available comparison methods, archiving frequency, such as daily or weekly, and the number of archive copies to be retained, assuming that the selected comparison method permits multiple archive levels. For example, byte differencing, as discussed below, may permit multiple archived versions of a file while block differencing, also discussed below, may not. File 344 is part of a second backup set (not shown), the files of which can be archived using settings that are the same or different from those of the first backup set.

CPU 320 carries out the selected one of the available comparison methods to generate indicia of differences between a file to be archived and its archive copy. For example, the archive copy may be resident on server computer 300. CPU 320 can then control network interface 350 to convey the indicia to server computer 300 via network connection 200.

Server computer 300 includes conventional hardware, notably a user interface 390, a CPU 316, such as an Intel PENTIUM III, memory 370, such as 128-256 KB of SDRAM and BIOS ROM, a hard disk 380 suitably configured for the usage and reliability demands of an archival server, such as a SCSI RAID having 20-40 GB capacity, and a network interface 375, all conventionally interconnected via a bus 395. Server computer 300 preferably also includes a tape backup 392 coupled to bus 395 using a conventional interface, such as SCSI. Bus 395 can include a conventional high-speed bus such as 100 MHz, 32-bit bus, coupling CPU 320 and memory 330 and one or more buses that may be of a different speed, such as SCSI, PCI and AGP coupling CPU 360 to hard disk 380, network interface 375, and, as desired, other hardware in server computer 300.

Hard disk 380 includes magnetically recorded indicia of files, encoded and retrieved under control of CPU 360. Hard disk 380 includes indicia of a first archive file 382 named "file 1 arc" which includes a copy of file 342 as it was last archived. Hard disk 380 also includes indicia of a second archive file 384 named "file 2 arc," which includes a copy of file 344 as it was last archived. If information is lost from file 342 or 344 on client computer 100, the last archived version of the file can be restored onto the same computer or a different computer from archive file 382 or 384, respectively.

When using byte differencing in an exemplary method of the invention, the file being backed up, "file 1", is compared with its archived version, "file 1 arc". The byte differencing engine is called to generate both forward deltas and backward deltas. A forward delta is from "file 1 arc" to "file 1" and a backward delta from "file 1" to "file 1 arc". Both the forward and backward deltas are transmitted to the server for archiving. The server has copy of "file 1 arc" as well as N backward deltas that would enable it to reproduce the N previous versions of "file 1". When the backup package containing the forward and backward deltas for "file 1", the server applies the forward delta to its copy of "file 1 arc" to generate an up-to-date copy of "file 1". The server renames this copy of "file 1" to "file 1 arc" and replaces the previous copy of "file 1 arc". The server also stores the backward delta that the server receives. At some subsequent point in time, the client requests from the server a restore of "file 1" that is M revisions old, where M is less than or equal to N. The server sends the client the M most recent back deltas for "file 1". Upon receipt of the back deltas, the client applies these back deltas in succession, newest to oldest, to its local copy of "file 1 arc", thereby recreating a copy of "file 1" that is M revisions old.

When CPU 320 of client computer 100 conveys indicia to server 300, network interface 350 transmits information to network interface 375 via network 200 using a conventional network protocol, such as TCP/IP. Suitable networks for conveying indicia of from a client computer to a server computer according to various aspects of the present invention include direct cable connection (DCC), Universal Serial Bus (USB), "sneakernet", which is the manual transmission of data on storage media, Ethernet, Appletalk, the Internet, and combinations of these.

To facilitate archiving of files 342 and 344, CPU 360 executes software from memory 370 that implements functions of a file archiving system (not shown). Any file archiving system can be employed that suitably modifies files responsive to information about the modifications to be made. Preferably, a file archiving system includes specialized software for server-side file archiving such as LIFEGUARD marketed by Computer Associates, Inc. having a division headquarters at Islandia, N.Y. CPU 320 conventionally loads the software from hard disk 340 into memory 330 by carrying out functions of a disk operating system such as WINDOWS NT or Linux. CPU 360 controls network interface 375 to convey the indicia from client computer 100 to hard disk 380.

FIG. 4 illustrates an archive system 400 on the client computer 100 in one embodiment of the invention. Referring to FIG. 4, archives files of a file set 402, conveying indicia of differences between the files and includes various functional blocks that can be implemented by software running on client computer 100 or any other suitable client computer. Functional blocks suitable for software implementation include a comparison subsystem 410, an operating system 430, and, in variations, a condition analysis subsystem 442 within a selection subsystem 440.

Comparison subsystem 410 includes a first comparator 412 and a second comparator 420. Comparator 412 uses the first comparison method to provide indicia of data words that are different between each file in a data store, file set 402, and archives of those files, which can reside on server 300. Comparator 420 uses a second comparison method to provide indicia of blocks of data words that are different between each file in set 402 and their archives. Selection of comparator 412 or comparator 414 can be made by user control and user interface subsystem 444 and/or, as indicated schematically by switch 443, by condition analysis subsystem 442.

Comparison subsystem 410 can include comparators in addition to comparators 412 and 420. For example, a comparator can be specifically configured for archiving of files generated by a conventional e-mail/contact manager software. An example of such software is MICROSOFT OUTLOOK 97, which generates a single large file for storage of personal contact information, e-mails sent and received, etc. Records within such a file have field headings that are proprietary to the software generating the file. These field headings can be used to partition the file into blocks.

One comparator variation that may be suitable for e-mail/contact manager software files extracts field headings of the file to be archived and compares the field headings to a set of field headings from the file as it was last archived. The comparator generates indicia of any portions of the file that corresponds to new field headings, such as blocks of data words beginning with field headings not present in the file as it was last archived.

Comparator 412 is a byte differencing engine because it generates indicia of differences between individual bytes, 16-bit words and other variations. Comparator 412 includes a data store 414 of copies of files as they were last archived, a selector/decompressor 416, a compressor 417, and a data word comparator 418. Data store 414 on a suitable storage medium, such as hard disk 340 of client computer 100 and stores the copies in compressed format, such as by using the Lempel-Ziv algorithm.

When updating the archive of a particular file from set 402, selector/decompressor 416 selects the corresponding copy of the file from data store 414, and converts the copy to uncompressed format. In variations where the benefits of compression are not required, selector/decompressor 416 can perform just a selection function. Data word comparator 418 compares the file from set 402 with the uncompressed copy of the file provided by selector/decompressor 416 to generate indicia of differences between the file and its archive, which resides on server 300. The copy of the file in data store 414 matches what is in the archive on server 300 to allow this comparison to be performed without requiring the entire contents of the archive file to be conveyed across network 200.

Functions of comparator 412 may be implemented by conventional revision control software such as RCE API version 2.0 marketed by XCC Software Technology Transfer GmbH. Software implementing system 400 can load a dynamic link library (DLL) that provides an interface to the RCE API software. Comparator 412 is then executed by making function calls using the loaded DLL.

A server computer may be protected from unexpected failure of a differencing engine by starting up a separate process on the server computer to perform the actual function call to the DLL for the desired differencing engine. An advantage of this approach is that the master server process is protected from unexpected failure in the differencing engine. If the differencing engine fails, the separate process that made the call to the differencing engine may also fail, but the master server process is unaffected. This allows the server to continue servicing requests made by other clients.

Comparator 420 is a block differencing engine because it generates indicia of differences between blocks of data words, such as 512-byte segments. Comparator 420 includes a data store 422 of token sets, a segmenter 426, a token generator 428, and a comparator 424. Tokens in data store 422 are statistically representative of files of data store 402 as they were last archived. When updating the archive of a particular file from set 402, segmenter 426 partitions the file into a plurality of blocks that, if combined, would reconstruct the file. For example, segmenter 26 may logically segment the file during the course of processing.

Token generator 428 generates tokens that are statistically representative of each block. Comparator 424 compares token sets from data store 422 to tokens from token generator from 428 and generates indicia of any differences between the file and its last archived based on differences between the tokens. Because each token is representative of a block of data words, comparator 424 generates indicia of one block having different data words for each token mismatch.

Comparators 412 and 420 have respective advantages. By providing a selection between comparators 412 in 420, a system according to various aspects of the present invention permits optimization of various conditions during archiving of files. For example, comparator 412 and the first comparison method it employs has an advantage of, inter alia, relatively compact indicia of differences between the file and its last archived. Only the byte differences between the file and archive need to be conveyed. Comparator 420 and the second comparison method it employs has an advantage of, inter alia, relatively compact storage on a client computer of information about the last file as last archived. For archiving of any given files in 402, token sets in data store 422 require considerably less storage capacity than copies of the files in data store 414. Comparators and their respective comparison methods can be selected in view of the above considerations.

A token set includes a plurality of tokens, each token being representative of a particular block of a file. A token according to various aspects of the print invention includes any data value that is statistically representative of a block of data. For example, tokens in token sets of data store 422 are cyclic redundancy code (CRC) values, such as 32-bit CRC values, that provide statistical information about respective blocks of a file from files at file set 402, as last archived. CRCs are uniquely determined, such as by using 32-bit values, based on both the magnitude of data values as well as their relative positions.

Simple tokens such as checksums can also be used, although such simpler tokens incur the risk of ignoring differences between a file and its archive. An exclusive- or (XOR) operation can also be employed during comparison. For example, a system may compare an updated file to an earlier file by comparing the XOR and CRC products of segments in the updated file to the XOR and CRC products in a token table. Other conventional differencing systems and methods may be employed advantageously in various configurations according to aspects of the present invention.

FIG. 5 is a flow diagram illustrating an exemplary method for updating an archive of a file. Referring to FIG. 5, the method can be implemented using user selection of a comparison method or automatic comparison method selection. Input data/process elements of the method relevant to user selection are designated with a dashed box labeled "A". Input data/process elements of the method relevant to automatic selection are designated with a dashed box labeled "B". Process 504 sends information to prompt a user and receives selection input from the user. A suitable dialog box that may be displayed by process 504 is illustrated in FIG. 2. When automatic selection is employed, process 502 receives information about one or more conditions indicative of a preferable one of the comparison methods to employ.

Process 504 activates one comparison method based on either user input or control output from process 502. When byte differencing, employed by comparator 412 of system 400, is selected, process 520 selects a copy 511 of file 509 and decompresses the copy. As discussed above, compression is optional, as are various other processes within the methods of the invention. Process 508 then compares data words from copy 511 with data words from file 509 and provides indicia 513 of differences between them. Indicia 513 is communicated to process 518, which is typically carried out on server 300. Communication of indicia 513 to process 518, when performed on a server computer, is indicated by network connection 200. Processes illustrated in FIG. 5 other than process 518 are carried out on a client computer.

Process 510 updates copy 511 of file 509 so that copy 511 is the same as file 509 in the significant information represented therein. Then further updates to file 509 can be archived by repeating the processes of FIG. 5. Multiple copies of file 509 in various stages of revision can be kept on the local computer to make it faster and more convenient to backup to previous revisions. No network connection is required for access to such copies.

When block differencing, employed by comparator 414 of system 400 is selected, process 506 segments or partitions file 509 into blocks, such as 512-byte portions of file 509. Process 512 then computes tokens, such as 32-bit CRCs, for each of the blocks to provide a first token set 515. Process 514 compares tokens of the first token set 515 to respective tokens of a second token set 507. The tokens of second token set 507 are tokens derived by processes 506 and 512 during previous archiving of previous versions of file 509. Process 514 compares the respective tokens to determine differences between blocks of file 509 and its last archived version, as statistically represented by second token set 507. Process 514 provides indicia 513 of differences between file 509 and that archived version, which are communicated to process 518 as discussed above.

Process 516 updates second token set 507 with first token set 515. Further updates to file 509 can be archived by repeating the processes of FIG. 5 using updated token set 507.

Process 518 updates an archive 517 of file 509, preferably on a server computer that may be physically separated in a different building, city, or even a different continent from the client computer on which file 509 resides. Process 518 can maintain a single version of file 509, such as a single-file archive, and be oriented to maintain, a desired number of archived versions. Providing a plurality of archived versions can be advantageous because a user can go back to a document revision or hard disk configuration that proves to be better than the most current version. Such functionality can be used in cooperation with conventional backup software such as that disclosed in U.S. Pat. No. 6,016,553.

FIGS. 6-9 illustrate an exemplary method for updating an archive of the computer file. Referring to FIG. 6, method 1000 begins at process 1010, where differencing DLLs are loaded if available. Then process 1020 retrieves backup set definition from local file. Then process 1030 traverses directories and evaluates files per backup set definition. The process flow procedure moves to decision step 1035.

Decision step 1035 determines whether the current file is to be backed up. If yes then process flow proceeds to process 1040. Process 1040 determines differencing method to be used. Process 1040 is explained in more detail in association with FIG. 10. The process flow procedure then moves to decision step 1050. Decision step 1050 decides whether to use byte differencing engine. If so, then process flow proceed to continuation method 1500, as indicated by circle A1. If not, then process flow proceed to continuation method 2000, as indicated by circle B1.

In continuation method 1500 illustrated in FIG. 7, the process flow continues at process 1510, which opens database for file and gets the ID of the last revision. Then process 1520 decompresses last revision. Then process 1530 creates backward delta by calling suitable subroutines. Then process 1540 creates forward delta by calling suitable subroutines. Then process 1550 compresses the new file. Then process flow proceeds to continuation method 2000, as indicated by circle A2.

Figure 8:
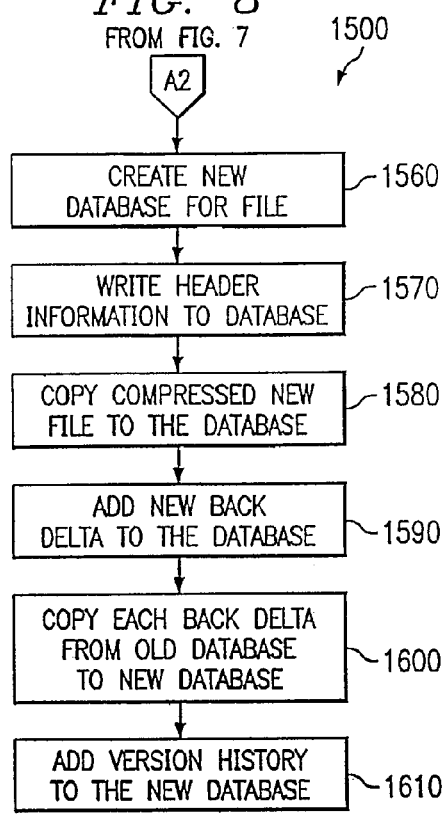

In the continuation of method 1500 illustrated in FIG. 8, the process flow continues at 1560, which creates new database for file. Then process 1570 writes header info to database. Then process 1580 copies compressed new file to the database. Then process 1590 adds new back delta to the database. Then process 1600 copies each back delta from the old database to new database. Then 1610 adds version history to the new database.

Figure 9:
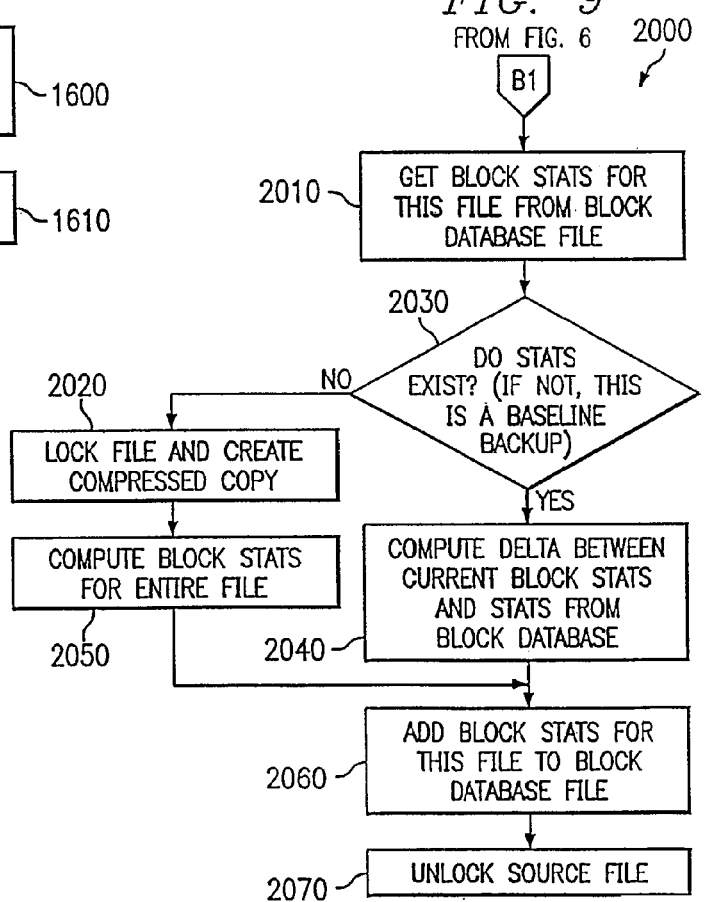

Continuation method 2000 is illustrated in FIG. 9. At step 2010, block statistics for this file are retrieved from the block database file. Then, at decisional step 2030, method 2000 determines whether the statistics for the file exist. If the statistics do not exist then a baseline backup is being performed and the no branch of decisional step 2030 leads to step 2020.

At step 2020, the file is locked and a compressed copy of the file is created. Proceeding to step 2050, method 2000 computes block statistics for the entire file. Returning to decisional step 2030, if the statistics do exists, then the yes branch of decisional step 2030 leads to step 2040. At step 2040, method 2000 computes a delta between the current block statistics and the block statistics retrieved from the block database. Then, at step 2060, the block statistics for this file are added to the block database file. Next, at step 2070, the source file is unlocked.

Figure 10:
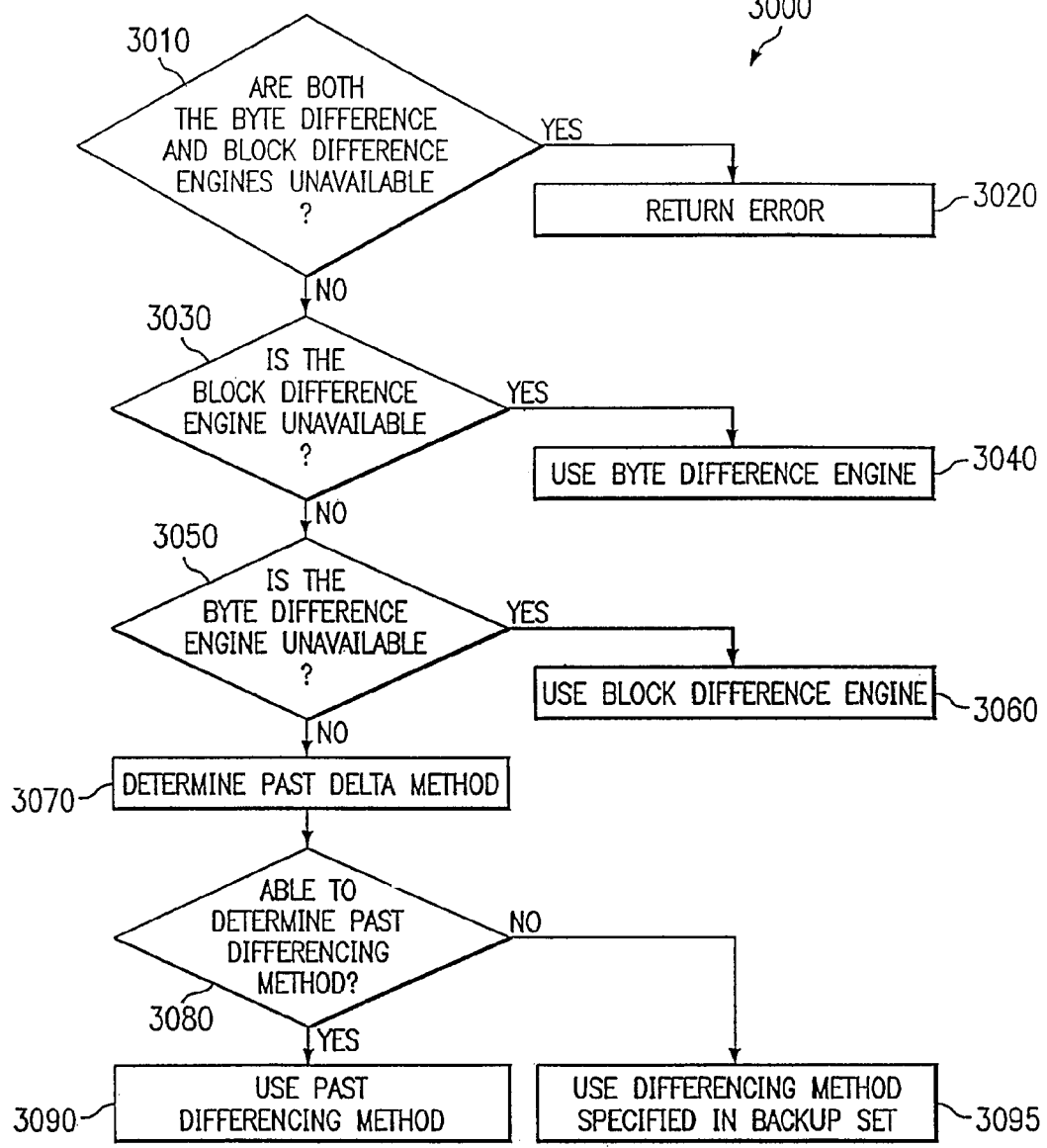
FIG. 10 is a flowchart illustrating a method for determining a differencing method to be used according to one embodiment of the present invention.

FIG. 10 is a flowchart illustrating a method for determining a differencing method to be used. Method 3000 begins at decisional step 3010 where method 3000 determines whether both the byte difference engine and the block difference engine are unavailable. If both engines are unavailable, then the yes branch of decisional step 3010 lead to step 3020. At step 3020 an error is returned. If either or both engines are available, then the yes branch of decisional step 3010 leads to decisional step 3030.

At decisional step 3030, method 3000 determines whether the block difference engine is unavailable. If the block difference engine is unavailable, then the yes branch of decisional step 3030 leads to step 3040. At step 3040, method 3000 uses the byte difference engine. If the block difference engine is available, then the no branch of decisional step 3030 leads to decisional step 3050. At decisional step 3050, method 300 determines whether the byte difference engine is unavailable. If the byte difference engine is unavailable, then the yes branch of decisional step 3050 leads to step 3060. At step 3060, method 3000 uses the block difference engine. If the byte difference engine is available, then the no branch of decisional step 3050 leads to step 3070.

At step 3070, method 3000 determines the past delta method. Next, at decisional step 3080, method 3000 determines whether method 3000 is able to determine the past differencing method. If method 3000 is able to determine the past difference method, then the yes branch of decisional step 3080 leads to step 3090. At step 3090, method 3000 uses the past differencing method. If method 3000 is unable to determine the past differencing method, then the no branch of decisional step 3080 leads to step 3095. At step 3095, method 3000 uses the differencing method specified in the backup set.

While the present invention has been described in terms of preferred embodiments and generally associated methods, alterations and permutations of the preferred embodiments and method will be apparent to those skilled in the art. Accordingly, the above description of preferred exemplary embodiments does not define or constrain the present invention.

Other changes, substitutions, and alterations are also possible without departing from the spirit and scope of the present invention, as defined by the following claims.

What is claimed is:

1. A system for updating an archive of a computer file, comprising:
    a hard disk configured to store a file on a client computer;
    a byte differencing engine configured to generate one or more first indicia of difference between individual bytes in the file stored in the hard disk and corresponding individual bytes associated with an archive of the file, wherein the one or more first indicia of difference generated with the byte differencing engine includes one or more of the individual bytes in the file stored in the hard disk that are different from the corresponding one or more individual bytes associated with the archive of the file;
    a block differencing engine configured to generate one or more second indicia of difference between a first set of tokens that statistically represent the file stored in the hard disk and a second set and of tokens that statistically represent the archive of the file, wherein the one or more second indicia of difference generated with the block differencing engine includes one or more multiple byte blocks in the file stored in the hard disk that are different from one or more corresponding multiple byte blocks associated with the archive of the file;
    a condition analysis subsystem configured to automatically select either the byte differencing engine or the block differencing engine to update the archive of the file based on whether one or more criteria associated with the client computer satisfy a predetermined condition, wherein the condition analysis subsystem is configured to automatically select the block differencing engine in response to determining that the one or more criteria associated with the client computer satisfy the predetermined condition or the byte differencing engine in response to determining that the one or more criteria associated with the client computer do not satisfy the predetermined condition; and
    a processor configured to convey either the one or more first indicia of difference or the one or more second indicia of difference from the client computer to a server computer to update the archive of the file in response to the condition analysis subsystem selecting either the byte differencing engine or the block differencing engine to update the archive of the engine includes one or more of the individual bytes in the file stored in the hard disk that are different from the corresponding one or more individual bytes associated with the archive of the file.

2. The system of claim 1, wherein the condition analysis subsystem is configured to automatically select the byte differencing engine in response to determining that the one or more criteria associated with the client computer satisfy the predetermined condition or the block differencing engine in response to determining that the one or more criteria associated with the client computer do not satisfy the predetermined condition.

3. A method for updating an archive of a computer file, comprising:
    storing a file on a client computer;
    selecting either a byte differencing engine or a block differencing engine to update an archive of the file, wherein a condition analysis subsystem automatically selects either the byte differencing engine or the block differencing engine based on whether one or more criteria associated with the client computer satisfy a predetermined condition;
    generating one or more first indicia of difference between the file and the archive of the file to update the archive of the file, wherein the generating the one or more first indicia of difference includes: comparing, in response to the condition analysis subsystem selecting the byte differencing engine, individual bytes in the file stored on the client computer with corresponding individual bytes associated with the archive of the file to generate the one or more indicia first of difference;
    comparing, in response to the condition analysis subsystem selecting the block differencing engine, a first set of tokens that statistically represent the file stored on the client computer with a second set and of tokens that statistically represent the archive of the file to generate one or more second indicia of difference; and
    conveying either the one or more first indicia of difference generated with the byte differencing engine or the one or more second indicia of difference generated with the block differencing engine from the client computer to a server computer, wherein the server computer uses the one or more first indicia of difference conveyed from the client computer to update the archive of the file;
    wherein the one or more first indicia of difference generated with the byte differencing engine includes one or more of the individual bytes in the file stored in the hard disk that are different from the corresponding one or more individual bytes associated with the archive of the file,
    wherein the one or more second indicia of difference generated with the block differencing engine includes one or more multiple byte blocks in the file stored in the hard disk that are different from one or more corresponding multiple byte blocks associated with the archive of the file,
    wherein the condition analysis subsystem automatically selects the block differencing engine in response to determining that the one or more criteria associated with the client computer satisfy the predetermined condition or the byte differencing engine in response to determining that the one or more criteria associated with the client computer do not satisfy the predetermined condition.

4. The method of claim 3, wherein the byte differencing engine identifies one or more of the individual bytes in the file stored on the client computer that are different from the corresponding one or more individual bytes associated with the archive of the file to generate the one or more first indicia of difference.

5. The method of claim 4, wherein the block differencing engine identifies one or more multiple byte blocks in the file stored on the client computer that are different from one or more corresponding multiple byte blocks associated with the archive of the file to generate the one or more second indicia of difference.

6. The method of claim 3, wherein the condition analysis subsystem automatically selects the byte differencing engine in response to determining that the one or more criteria associated with the client computer satisfy the predetermined condition or the block differencing engine in response to determining that the one or more criteria associated with the client computer do not satisfy the predetermined condition.

* * * * *